United States Patent Office 3,694,408
Patented Sept. 26, 1972

3,694,408
ORGANIC NITROGENOUS COMPOUNDS AND POLYMERS THEREOF
John Hynds, John Maddison Phillipson, and Edward Jervis Vickers, Manchester, England, assignors to Imperial Chemical Industries Limited, London, England
No Drawing. Filed Sept. 21, 1970, Ser. No. 74,123
Claims priority, application Great Britain, Sept. 26, 1969, 47,792/69
Int. Cl. C08g 33/02
U.S. Cl. 260—47 R
13 Claims

ABSTRACT OF THE DISCLOSURE

Polymerisable compositions are described which contain in the molecule at least two groups of the formula $$\begin{matrix}\diagdown\\ \diagup\end{matrix}C\text{—}NH.CN$$

linked together through an organic residue which is itself composed of smaller organic residues linked through groupings of the formula $$\begin{matrix}\diagdown\\ \diagup\end{matrix}C\text{—}\underset{\underset{CN}{|}}{N}\text{—}C\begin{matrix}\diagup\\ \diagdown\end{matrix}$$

In particular, the compositions are the products of reaction of an excess of a salt of an organic biscyanamide or polycyanamide with an organic dihalogeno or polyhalogeno compound. The compositions are valuable for the manufacture of coatings, castings, laminates and mouldings.

---

This invention relates to novel polymerisable nitrogenous organic materials, more particularly to certain polymerisable compositions which contain at least two polymerisable $$\begin{matrix}\diagdown\\ \diagup\end{matrix}C\text{—}NH.CN$$

groups, to processes for the manufacture of such materials and to polymers obtained from such materials.

According to the present invention there are provided polymerisable compositions which contain in the molecule at least two polymerisable groups of the formula $$\begin{matrix}\diagdown\\ \diagup\end{matrix}C\text{—}NH.CN$$

linked together through an organic residue which is itself composed of smaller organic residues linked through groupings of the formula $$\begin{matrix}\diagdown\\ \diagup\end{matrix}C\text{—}\underset{\underset{CN}{|}}{N}\text{—}C\begin{matrix}\diagup\\ \diagdown\end{matrix}$$

The polymerisable compositions of the invention may be either linear or branched and they may be pure compounds or oligomers or polymers; they are capable of undergoing polymerisation, or further polymerisation, through trimerisation of the —NH.CN groups present, so as to form useful cross-linked polymeric products.

Preferred compositions according to the invention are those having the formula $$CN.NH.R\left(\underset{\underset{CN}{|}}{N}.R'.\underset{\underset{CN}{|}}{N}.R\text{—}\right)_n NH.CN \quad (I)$$

wherein R and R' are divalent hydrocarbon groups which may optionally be substituted and/or interrupted by hetero-atoms or by simple divalent groups such as —O—, —S—, —SO$_2$—, —CO—, —CONH—, —CONR''—, where R'' is a lower alkyl group, or —Si(CH$_3$)$_2$—, and $n$ is an integer of at least 1.

The groups R contained within a single molecule may be all the same or different, and similarly the groups R' contained within a single molecule may be all the same or different. Examples of suitable groups R and R' will be apparent from the references made hereinafter to examples of compositions according to the invention and of intermediates from which the compositions may be manufactured.

An especially preferred group of compositions having the Formula I comprises those in which R is a simple divalent aromatic or araliphatic radical such as, for example, m-phenylene, p-phenylene, 2,4-tolylene, 2,6-tolylene, m-xylylene, p-xylylene, m-phenylene-bis-(ethylene)-, p-phenylene-bis-(ethylene)- or 2,7-naphthylene, or one of the following groupings:

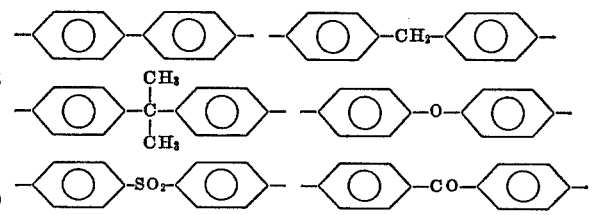

It is also especially preferred that R' in compositions having the Formula I is a simple aromatic, araliphatic or aliphatic grouping. Where the groups R' are wholly divalent aliphatic groups, it is preferred that they be relatively short-chain polymethylene groupings; alternatively the groups R' may be selected so that only some of them are aliphatic, the remaining groups R' being aromatic in character. Examples of preferred groupings R' are as follows:

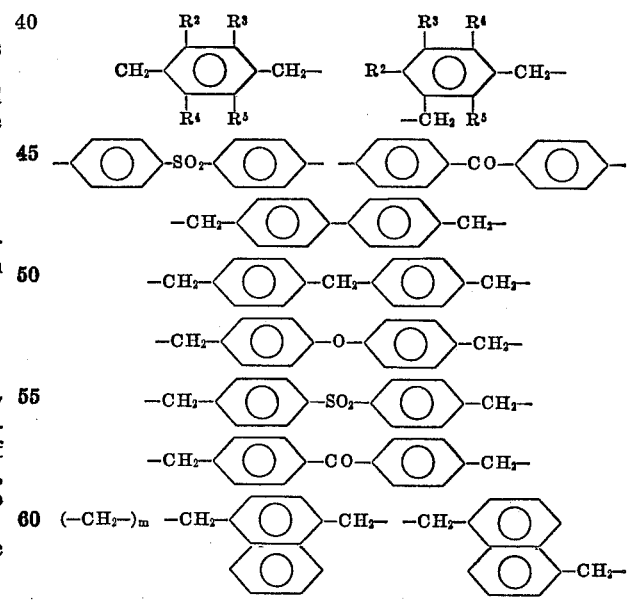

wherein R$^2$, R$^3$, R$^4$, R$^5$ are preferably hydrogen or methyl, and $m$ is an interger from 2 to 6 inclusive.

Examples of compositions according to the invention include the compounds having the following formulae:
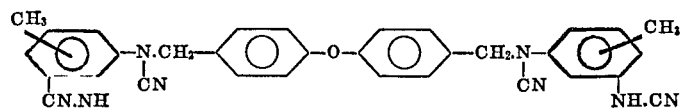
where the terminal groups may be
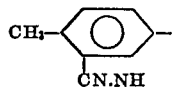
or
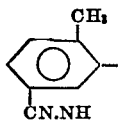
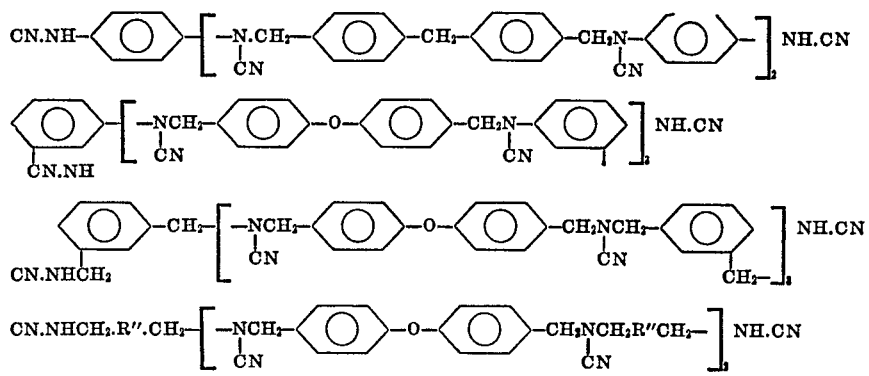
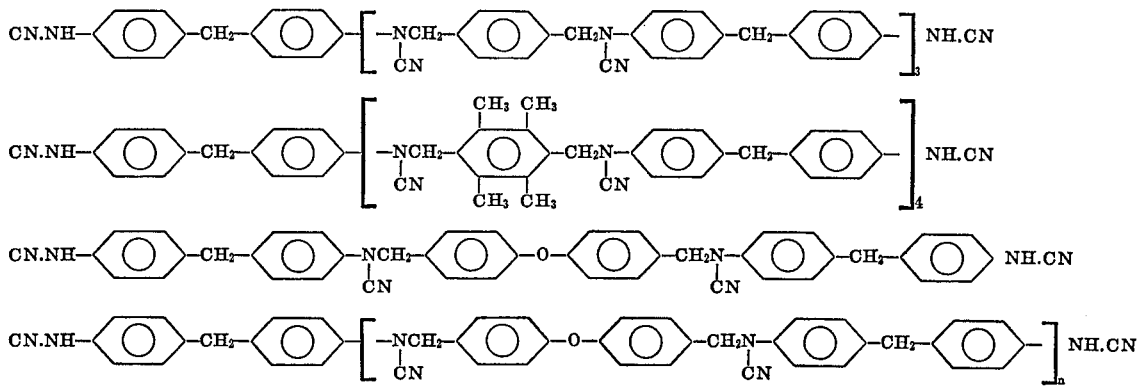
where R" is a mixture of m- and p-phenylene units in the proportion, for example, of 70% meta and 30% para.
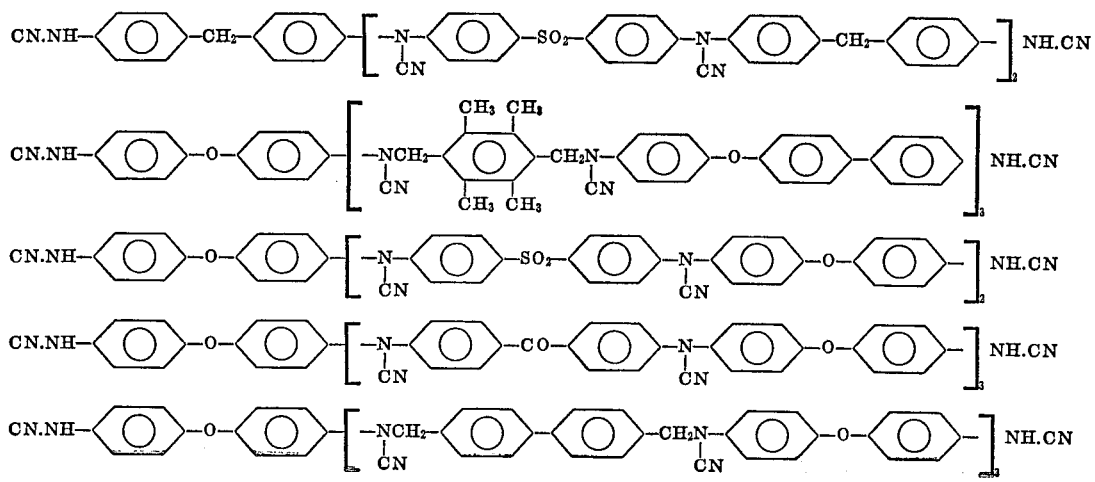
where $n$ has an average value of 2 or 3

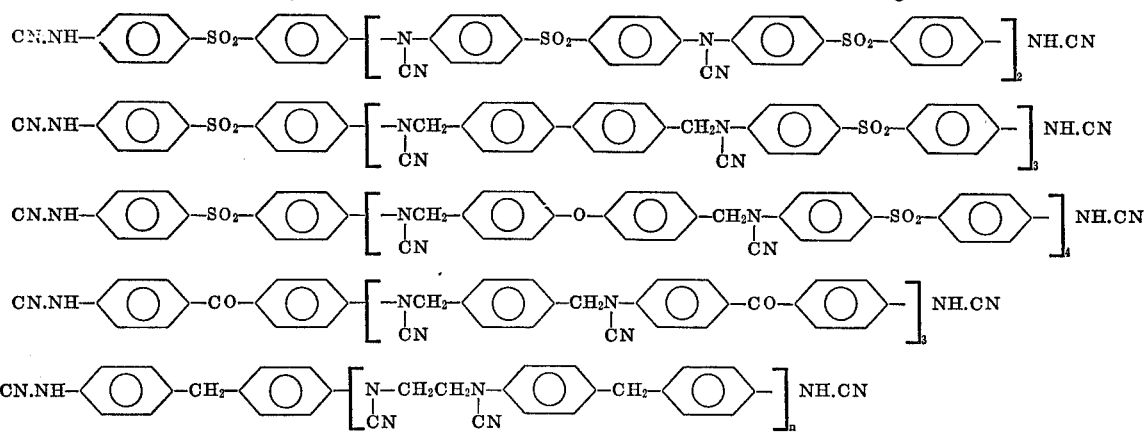

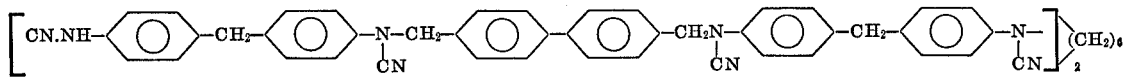

where n=2, 3, or 4

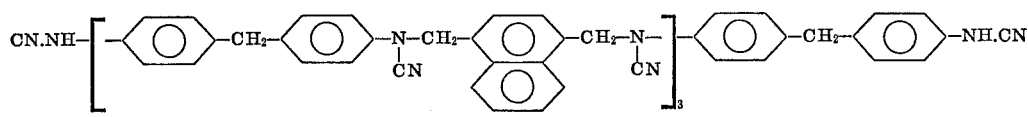

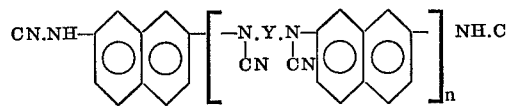

Where

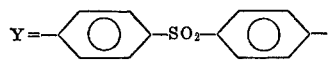

and n=2

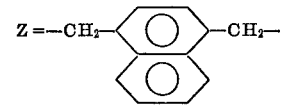

Where $Z = -CH_2-\langle\bigcirc\rangle-CH_2-$ and m=4

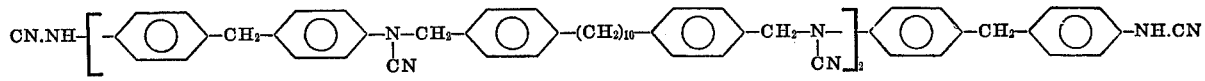

Where

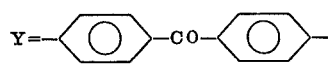

and n=2
Where

and n=3
Where

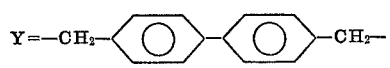

and n=2

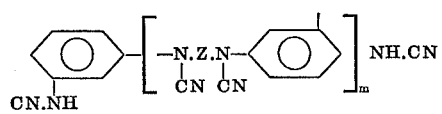

Where

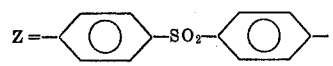

and m=3

Where

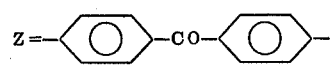

and m=4

In general, n in Formula I above preferably has a value in the range 2–15. Other examples of compositions according to the invention thus include compounds of structure analogous to those indicated in the foregoing formulae except that the numbers of repeat units, denoted in the formulae by the groupings enclosed within square brackets, which they contain are different from those actually given in the formulae in question and in general are integers lying in the range 2–15. The compositions of the invention may also consist of statistical mixtures of such compounds the individual constituents of which differ only in respect of the number of such repeat units present; such a mixture may be denoted by a single formula with the number n of repeat units expressed as an average, non-integral value.

The present invention includes a process for manufacture of the polymerisable compositions hereinbefore defined, which comprises reacting a salt of an organic polycyanamide containing two or more —NH.CN groups in the molecule with an organic polyhalogeno compound containing two or more halogen atoms reactive towards —NH.CN groups in the molecule, in such molecular proportions that the —NH.CN groups present are in sufficient excess over the reactive halogen atoms present to yield a condensate containing at least two unreacted —NH.CN groups in the molecule.

Organic polycyanamides the salts of which are suitable for use in the process of the invention include compounds of the aliphatic, cycloaliphatic, aromatic or araliphatic series which contain two or more —NH.CN groups in the molecule.

Examples of suitable aliphatic polycyanamides include tetramethylene biscyanamide, pentamethylene biscyanamide, hexamethylene biscyanamide, heptamethylene biscyanamide, octamethylene biscyanamide, nonamethylene biscyanamide, decamethylene biscyanamide and dodecamethylene biscyanamide.

Examples of suitable cycloaliphatic polycyanamides include 1,4-bis (cyanamido)-cyclohexane and 4,4'-bis (cyanamido)-dicyclohexylmethane.

Examples of suitable aromatic polycyanamides include m-phenylene biscyanamide, p-phenylene biscyanamide, 2,4-tolylene biscyanamide and 2,6-tolylene biscyanamide and mixtures thereof, 4,6-dimethyl-1,3-phenylene biscyanamide,
dicyanamidodurene,
2-ethyl-1,4-phenylene biscyanamide,
4-chloro-1,3-phenylene-biscyanamide,
4,6-dichloro-1,3-phenylene biscyanamide,
2,5-dichlor-1,4-phenylene biscyanamide,
2,3,5,6-tetrachloro-1,4-phenylene biscyanamide,
4-methyl-6-chloro-1,
3-phenylene biscyanamide,
2,4-biscyanamidoanisole,
2,4-biscyanamido phenetole,
3,3'-biscyanamidodiphenylmethane,
4,4'-biscyanamidodiphenylmethane,
3-methyl-4,4'-biscyanamidodiphenylmethane,
3,3'-dimethyl-4,4'-biscyanamidodiphenylmethane,
4,4'-biscyanamidodiphenyl,
2,2-bis-(4'-cyanamidophenyl)propane,
1,2-bis-(4-cyanamidophenyl)ethane,
4,4'-biscyanamidodiphenylether,
3,3'- and 4,4'-biscyanamidobenzophenone,
3,3'- and ,4'-biscyanamidobenzophenone,
3,3'- 3,4'-, 3',4'- or 4,4'-biscyanamidobenzanilide,
4,4'-biscyanamido-N-ethylbenzanilide,
1,4-bis(3'-cyanamidobenzoyl) benzene,
3-cyanamido-3'-(3''-cyanamidobenzoyl) diphenylsulphone,
1,3- and 1,4-bis(4'-cyanamidophenoxy) benzene,
4-cyanamido-4'-(4''-cyanamidophenoxy)diphenylsulphide,
4-cyanamido-4'-(4''-cyanamidophenoxy) diphenyl sulphone,
4,4'-bis-(4''-cyanamidophenoxy)diphenylether,
4,4'-bis-(4''-cyanamidophenoxy)diphenylsulphide,
1,3-biscyanamidonaphthalene,
1,5-biscyanamidonathpthalene,
1-cyanamido-4(4'-cyanamidophenyl) naphthalene,
4,4'-biscyanamido-1,1'-dinaphthyl,
tris (4-cyanamidophenyl)methane,
1,3,5-tris(3'-cyanamidophenyl) benzene and
1,3,5-tris(4'-chloro-3'-cyanamidophenyl)benzene.

Examples of suitable araliphatic polycyanamides include m-xylylene biscyanamide,
p-xylylene biscyanamide,
1,3- and 1,4-bis(2'-cyanamide-ethyl) benzene,
1-(2'-cyanamidoethyl)4-(4'-cyanamido-n-butyl) benzene, 1-methoxy-2,
4-bis (2'-cyanamidoethyl) benzene,
1,4-dimethyl-2,5-bis(2'-cyanamidoethyl) benzene,
1,3,5-tris(2'-cyanamidoethyl) benzene and
1-cyanamido-4-(3'-cyanamido-n-propyl) benzene,
4,4'-bis(cyanamidomethyl)diphenylether,
4,4'-bis(1-cyanamidoethyl)diphenyl ether,
4,4'-bis(2''-cyanamidoethyl) diphenyl ether,
4,4'-bis(cyanamidomethyl)diphenylmethane,
4,4'-bis(cyanamidomethyl)diphenyl,
4,4'-bis(1'-cyanamidoethyl)diphenyl,
4,4'-bis(1-cyanamidoethyl)diphenylmethane,
1,5-bis(cyanamidomethyl)naphthalene,
1,5-bis(1'-cyanamidoethyl)naphthalene and
9,10-bis(cyanamidomethyl)anthracene.

Salts of the foregoing organic polycyanamides which may be used in the process of the invention include the alkali metal salts, for example the sodium or potassium salts, thereof and the tertiary amine salts thereof.

Organic polyhalogeno compounds which are suitable for use in the process of the invention include compounds of the aliphatic, cycloaliphatic, aromatic and araliphatic series which contain at least two halogen atoms reactive towards —NH.CN groups. Such compounds may contain reactive fluorine, chlorine, bromine or iodine atoms. Compounds containing reactive chlorine or bromine atoms are, however, preferred.

Examples of suitable polyhalogeno compounds of the aliphatic series include alkylene dibromides such as 1,2-dibromethane, 1,3-dibromopropane, 1,4-dibromobutane, 1,5-dibromopentane, 1,6-dibromohexane and 1,10-dibromodecane, unsaturated dihalides such as 1,4-dichlorobutene-2 and 1,4-dibromobutene-2, and bromoalkylethers such as bis-(2-bromoethyl) ether, bis-(4-bromobutyl) ether and 1,8-dibromo-3,6-dioxaoctane.

Examples of suitable polyhalogeno compounds of the cycloaliphatic series include 1,3- and 1,4-bis(bromomethyl) cyclohexanes.

Examples of suitable polyhalogeno compounds of the aromatic series include 4,4'-dichlorodiphenyl sulphone, 4,4'-difluorodiphenylsulphone, 4,4' - difluorobenzophenone and 2,4-dichloronitrobenzene.

Examples of suitable polyhalogeno compounds of the araliphatic series include chlormethylated or brommethylated aromatic compounds such as 1,4-bis-(chlormethyl)-benzene,
1,3-bis-(bromomethyl)-benzene,
2,4-bis-(chlormethyl)-toluene,
2,5-bis-(chlormethyl)-p-xylene,
4,6-bis-(chlormethyl)-m-xylene,
bis-(chlormethyl)-mesitylene,
bis-(chlormethyl)-durene,
bis-(chlormethyl)-isodurene,
2,4-bis-(chlormethyl)-anisole,
2,4-bis-(chlormethyl)-5-chloroanisole,
2,5-bis-(chlormethyl)-1,4-dimethoxy-benzene,
1,2,4-tris-(chlormethyl)-benzene,
1,2,4,5-tetrakis-(chlormethyl)-benzenes,
4,4'-bis-(chlormethyl)-diphenyl,
4,4'-bis-(chlormethyl)-diphenylmethane,
1,2-bis-(4-chlormethylphenyl)-ethane,
1,10-bis-(4-chlormethylphenyl)-decane,
4,4'-bis-(chlormethyl)-diphenyl ether,
4,4'-bis-(chlormethyl)-diphenyl sulphone,
4,4'-bis-(bromomethyl)-diphenyl sulphone,
4,4'-bis-(chlormethyl)-benzophenone,
4,4'-bis-(bromomethyl)-benzophenone,
1,4- and 1,5-bis-(chlormethyl)-naphthalenes and mixtures thereof,
5,8-bis-(chlormethyl)-Tetralin, and
9,10-bis-(chlormethyl) anthracene.

Other suitable aromatic/aliphatic polyhalides include bromoalkyl esters of polyhydric phenols such as the bis-(3-bromopropyl)- and bis-(6-bromohexyl) ethers of resorcinol and hydroquinone.

Other suitable polyhalides in the aliphatic, alicyclic or aromatic series include those with aliphatic halogen activated by polar groups in the α-position such as oxygen, sulphur, carbonyl, carbonyloxy, or cyano groups. Included in this group are polyfunctional halomethyl ethers or thio ethers, haloacetic esters, halomethyl ketones, and halocyanomethyl derivatives. Examples of such polyhalides includes the chlormethyl ethers or chloracetic esters of aliphatic polyols such as ethylene, propylene, butylene, hexamethylene, decamethylene, diethylene and dipropylene glycols, 2,2-dimethyl-1,3-propanediol, glycerol, 1,1,1-trimethylolpropane, 1,2,4-butanetriol or 1,2,6-hexanetriol; similar derivatives from alicyclic diols such as 1,3- or 1,4-cyclohexanediol, 1,3 or 1,4-bis-(hydroxymethyl)-cyclohexane, and 2,2,4,4-tetramethylcyclobutane-1,3-diol; and similar derivatives from aromatic polyols such as 1,4-xylene-α,α'-diol. Chloracetic esters of polyhydric phenols may also be used, such as the esters from resorcinol, hydroquinone or 2,2-bis-(4-hydroxyphenyl)-propane.

Examples of suitable halomethyl ketones include 4,4'-bis-(bromacetyl)-diphenyl,
4,4'-bis-(bromacetyl)-diphenylmethane,
4,4'-bis-(bromoacetyl)-diphenyl ether,
1,6-bis-(4-bromacetylphenyl)-hexane, and
1,3,5-tris-(bromacetyl)-benzenes.

In place of polyhalides there may also be used, if desired, equivalent alkylating agents such as the sulphonic esters of polyols, in particular benzenesulphonic, p-toluene-sulphonic or methanesulphonic esters. Examples include the toluene sulphonic esters of ethylene, propylene, butylene and higher glycols, of xylylene glycol, and of alicyclic diols as hereinbefore mentioned.

Generally, the polyhalogeno or equivalent compound is reacted in an inert solvent with the salt of the polycyanamide, conveniently prepared in situ by neutralising the polycyanamide dissolved in the inert solvent with an appropriate base. Usually it is preferred to use the sodium or potassium salt of the polycyanamide in which all the cyanamide groups are in the form of a salt, conveniently obtained by adding an equivalent amount of a sodium or potassium alkoxide and then removing the by-product alkanol. After reactions with the polyhalogeno or equivalent compound the product is then treated with acid to regenerate the residual unreacted free cyanamide groups.

The time and temperature of the reaction depends on the reactivities of the component polycyanamide and polyhalogeno or equivalent compound, especially the polyhalogen or equivalent compound, and upon the solvent employed. Generally it is preferred to carry out the reaction at as low a temperature as is consistent with a reasonable rate of reaction. Temperatures between room temperature and 160° C. are generally suitable.

Any solvent may be employed which is inert to the polycyanamide and polyhalogeno or equivalent compounds, but generally it is preferred to use polar aprotic solvents since these have a beneficial effect in promoting the rate of reaction. Suitable polar aprotic solvents are amides such as dimethylformamide, dimethylacetamide, diethylformamide, N-methylpyrrolidone or hexamethylphosphoramide, and sulphoxides or sulphones such as dimethylsulphoxide and tetrahydrothiophene-1,1-dioxide.

When the polyhalogeno compound is a polychloro or polybromo compound, especially a polychloro compound, catalytic amounts of metal iodides, suitably sodium or potassium iodide, may be added to accelerate the reaction. Metal fluorides may be used to catalyse the reaction of aromatic chlorides such as 4,4'-dichlorodiphenyl sulphone.

The compositions of the invention are generally solid substances containing free —NH.CN groups which, as already stated, can be converted by trimerisation of the said groups into cross-linked polymeric materials. They are in many cases soluble and/or fusible, which permits of their being fabricated in a suitable manner prior to trimerisation.

According to a further feature of the present invention there is provided a process for the manufacture of polymeric materials which comprises trimerisation of the residual —NH.CN groups present in polymerisable compositions which contain in the molecule at least two polymerisable groups of the formula

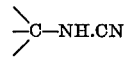

linked together through an organic residue which is itself composed of smaller organic residues linked through groupings of the formula

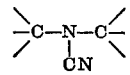

A preferred process for manufacturing polymeric materials according to the invention comprises trimerisation of the residual —NH.CN groups present in polymerisable compositions as defined by the foregoing Formula I.

Trimerisation of the free —NH.CH groups present in the compositions of the invention may in general be effected by maintaining the said compositions at or above room temperature for a suitable period of time, optionally in the presence of a catalyst.

Preferably the composition is heated to an elevated temperature in order to effect its polymerisation; the temperature to which it is heated depends upon a number of factors, in particular its inherent polymerisability, the other conditions of the polymerisation process, for example whether a solvent is present or not, and the presence or absence of a catalyst. In most cases, however, a temperature in the range of 50°–250° C. is suitable. The optimum temperature and time of polymerisation for a given composition can readily be found by simple experiment.

In cases where the compositions are solid at room temperature, the composition may conveniently be heated to a temperature which is above its melting point, so that polymerisation takes place in the molten state. In this instance, finished polymeric products may be obtained by the use, for example, of straightforward casting techniques. With most of the solid compositions of the invention, however, such a procedure may not be satisfactory since polymerisation may be so rapid that the melt quickly resolidifies, or it may occur below the melting point, so that the composition never detectably melts at all but rather appears to sinter. In such cases it may be convenient to utilise alternative procedures, for example, by dissolving the composition in a liquid solvent before polymerisation. Suitable solvents include ketones such as cyclohexanone and methylethylketone; alcohols such as ethanol, isopropanol and butanol; dioxan; and especially dimethylformamide and dimethylacetamide. It is of course desirable in most instances that the solvent should be capable of being removed by volatilisation during the polymerisation. Other alternative procedures include the use of moulding powder techniques involving the application of heat and pressure to the composition, as for example in a compression or injection moulding technique, kinetic moulding under impart and a fluidised powder coating technique in which the composition is applied in solid form to a preheated substrate whereby very rapid melting is achieved.

Such processes are assisted by the absence of formation of any volatile by-products during polymerisation which is a general feature of polycyanamides.

Catalysts which may be employed in the polymerisation process of the invention include bases and phenolic compounds. Suitable basic catalysts include strong bases, such as the alkali metal hydroxides and quaternary ammonium hydroxides, amines such as diethylene triamine, tetramethyl guanidine, 1,3,5 - tris-(3-dimethylaminopropyl)-hexahydro-1,3,5-triazine and other basic compounds such as alkali metal derivatives of cyanamides, "onium" hydroxides other than the quaternary ammonium hydroxides already mentioned, "onium" alkoxides and combinations of tertiary amines with epoxides. Suitable phenolic catalysts include phenol, 2,2-bis-(4-hydroxyphenyl)-propane and o- and p-nitrophenol.

The polymerisation process of the invention may be effected either in a single stage or in two or more stages. Thus the composition according to the invention may be caused to polymerise in a first stage to a limited extent only, so as to provide a partially condensed material or prepolymer which may be capable of being stored at room temperature without undergoing further change, and in a second stage this prepolymer may be heated in order to complete the polymerisation. Such prepolymers may in some cases be more convenient starting materials than the original compositions from which they are derived for the production of polymers according to the invention.

Advantageously, the first stage of the polymerisation process may be carried out in the presence of a solvent as described above, and the partial condensate obtained by subsequent evaporation of the solvent then treated in a second stage to complete its polymerisation, for example by heating at a temperature of 50°–200° C. or higher.

Cross-linked polymeric products may be obtained either by polymerising a composition according to the invention as hereinbefore defined, or by copolymerising such a composition with other organic compounds containing cyanamide, —NH.CN groups. Compounds containing cyanamide groups which are suitable for copolymerisation include other polymerisable compositions as hereinbefore described and other known organic monocyanamides and polycyanamides. Examples of suitable monocyanamides include straight-chain and branched-chain aliphatic cyanamides in which the aliphatic chain contains preferably from 4 to 18 carbon atoms, for example butyl cyanamides, alicyclic cyanamides such as cyclohexyl cyanamide and 1-methyl-1-cyanamidocyclohexane, aralkyl cyanamides such as benzylcyanamide, 4-chloro- or 4-bromobenzyl cyanamide and 2,4- or 3,4-dichlorobenzyl cyanamide, and aromatic cyanamides such as o-, m- and p-chlorophenyl cyanamides, o-, m- and p-tolyl cyanamides, m- and p-methoxyphenyl cyanamides, m- and p-ethoxyphenyl cyanamides and α- and β-naphthyl cyanamides. Examples of suitable biscyanamides include the aliphatic, cycloaliphatic, aromatic and araliphatic biscyanamides hereinbefore described.

In the case where a composition according to the invention is to be copolymerised with an organic mono- or poly- cyanamide which is of a similar order of polymerisability and with which it is compatible in the melt, polymerisation may readily be effected by heating the mixture of components to a temperature sufficiently high to effect melting or sintering. Fabricaiton from the melt may be assisted by the use of such mixtures which are lower melting. Where the components which are to be copolymerised are of widely differing degrees of polymerisability or are incompatible in the melt, it may be advantageous to subject the mixture of components to a precondensation step in solution as described above, and then to complete the polymerisation process.

Cross-linked polymeric products may also be obtained by polymerising a composition according to the invention in the presence of other compounds reactive therewith, such as polyepoxides, for example diphenylolpropane diglycidyl ether, or methylol or methoxymethyl compounds, for example hexamethoxymethylmelamine.

Poymerisable compositions made according to the process of the present invention, whilst possessing a structure conforming substantially to Formula I above, may in fact contain minor amounts of organic monocyanamides arising, for example, from the use of slightly impure starting materials or to the minor occurrence of side-reactionss during the production of the compositions. If desired, these mono cyanamide impurities may be removed from the compositions before polymerisation; however, the unpurified compositions containing a major proportion of substances having the Formula I but containing minor amounts of monocyanamides can equally well be polymerised to give useful products.

Of particular value are the polymeric materials obtained by trimerisation of compositions according to the invention having Formula I, since these matreials possess a higher degree of flexibility; when the groupings R and R' are mainly unsubstituted aromatic radicals the polymers additionally have a high degree of thermal stability and a high glass transition temperature. It is known to polymerise alkylene biscyanamides, but even the long-chain members of this class, such as dodecamethylene biscyanamide, give polymers having only moderate flexibility, due to a still relatively high cross-linking density, and additionally the glass transition temperature is very low and the thermal stability is inadequate for many purposes. Polymers from aromatic polycyanamides have also been described in our copending application No. 34,181/69. The polymers from the simpler aromatic dicyanamides such as the phenylene or substituted phenylene-bis-cyanamides, or from simple dinuclear dicyanamides such as 4,4'-dicyanamidodiphenylmethane, which are preferred on economic grounds, possess improved thermal stabilities and higher glass transition temperatures in comparison with the alkylene biscyanamide polymers, but again show insufficient flexibility for wide application. Better flexibility is obtained with polymers from longer chain dicyanamides such as, for example,

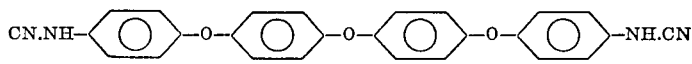

due to the lower cross-linking density and high proportion of flexible ether links, but such monomers are less easily accessible and more expensive to make. The preferred composition of the present invention having the Formula I can be made to have similarly long chains between the terminal cyanamide groups, but they have the advantage that they can be prepared much more easily and cheaply from simple intermediates. They also have the further advantage of versatility, in that the chain length and proportion of flexible links can be readily adjusted to give any desired balance of properties in the derived polymers.

The properties of the polymeric materials obtained by trimerisation of the compositions of the invention render them eminently suitable for the fabrication of films, coatings, castings, laminates and mouldings. They are of particular value for the production of protective coatings on substrates such as metal or glass, or for impregnating textile materials. The said polymeric materials may optionally incorporate fillers, in particular reinforcing fillers such as asbestos or fibre-glass or other high strength fibres or whiskers such as carbon fibres, pigments, plasticisers and stabilisers.

The invention is illustrated but not limited by the following examples, in which parts and percentages are by weight:

EXAMPLE 1

0.46 part of sodium is dissolved in 15.8 parts of methanol, followed by 2.48 parts of 4,4'-dicyanamidodiphenyl methane. 23.5 parts of dry dimethyl acetamide are added and the methanol is removed under vacuum, care being taken to exclude moisture. 1.5 parts of 4,4'-bis-(chloromethyl) diphenylether are dissolved in 4.7 parts of dimethyl acetamide and are added dropwise over 15 minutes to the solution of the sodium salt of 4,4'-dicyanamido diphenyl methane. The reaction mixture is stirred at room temperature for 18 hours, during which time a precipitate of sodium chloride is formed.

The mixture is then poured into 100 parts of a 1% aqueous solution of acetic acid, and the resulting white precipitate is filtered and washed acid-free with water. The filter cake is stirred with 18 parts of ether, filtered, and dried in a desiccator. About 3.4 parts of a creamy white solid condensate are obtained.

The product is free from chlorine and the infra-red spectrum shows characteristic peaks at 3180 cm.$^{-1}$ (—NH—), 2220 cm.$^{-1}$ (—C≡N), and 1240 cm.$^{-1}$ (aromatic ether). Elementary analysis is consistent with the approximate average structure below:

The product is soluble in cyclohexanone, dimethylformamide and dimethylacetamide.

The condensate is dissolved in a minimum of dimethylacetamide and a film cast on to an aluminium plate treated with a mould-release agent. The still wet film is cured by heating for 1 hour at 150°–160° C. The film is stripped from the base and is clear, pale yellowish, tough, and flexible, as shown by recovery from repeated creasing. Thermogravimetric analysis of the film carried out in air at a heating rate of 6° C. per minute shows an initial weight loss of 6% terminating at 275° C., due to residual solvent; there is then no further weight loss until the start of a slow decomposition occurring between 390 and 420° C. At 500° C. the percent loss in weight (excluding solvent loss) is 6.1%.

EXAMPLE 2

By the process of Example 1, a similar condensate is made using 0.46 part of sodium, 1.72 parts of 2,4-tolylene dicyanamide, and 1.335 parts of 4,4' - bis - (chloromethyl)-diphenyl ether. The product shows the same infra-red peaks as the product of Example 1, and elementary analysis supports the structure (or average structure) below:

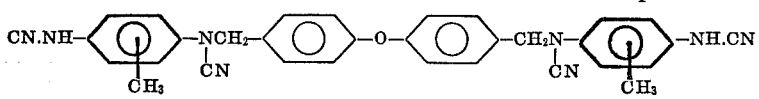

Cured films are slightly less flexible than those from the product of Example 1, but are very much superior to cured films from the starting 2,4-tolylene dicyanamide, which are very brittle. Thermogravimetric analysis is air also shows a slightly lower initial decomposition temperature of 370–380° C.

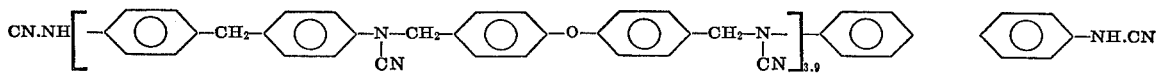

EXAMPLE 3

12.26 parts of sodium are dissolved in 158 parts of methanol followed by 42.13 parts of m-phenylene dicyanamide. 188 parts of dimethylacetamide are added and the methanol is removed under vacuum at 30–35° C. A white suspension is formed. 53.4 parts of 4,4'-bis-(chloromethyl)-diphenylether are dissolved in 70.5 parts of dimethylacetamide and are added dropwise with stirring over 35 minutes to the suspension of the disodium salt of m-phenylenedicyanamide. The reaction mixture is stirred at room temperature for 18 hours.

The resulting turbid solution is filtered to remove a small amount of insoluble material and the filtrate poured into 1500 parts of a 1% aqueous solution of acetic acid. The resulting white precipitate is filtered, washed acid free with water, and dried in vacuo, yielding 75 parts of a white powder.

The product is free from chlorine and the infra-red spectrum shows characteristic bands at 3180 cm.$^{-1}$ (—NH—) 2220 cm.$^{-1}$ (—C≡N) and 1240 cm.$^{-1}$ (aromatic ether). By titration with sodium methoxide solution, the product is found to contain 4.59% of the —NHCN group. The composition melts in the range 110–120° C.

73 parts of the composition are mixed with 27 parts of dimethyl acetamide at room temperature till a viscous liquid is obtained. A metal mould containing a cavity 5 x 1 x 0.2 cm. is lined with aluminium foil, and filled with the viscous solution. The filled mould is placed in a vacuum oven, and heated to 80–90° C., thus lowering the viscosity of the liquid, and enabling the bulk of the solvent to be removed under reduced pressure. After 15 minutes, atmospheric pressure is re-established, and the casting is heated at 150° C. for 24 hours. A clear, uniform, tough, amber-coloured casting is obtained, of flexural modulus 3.33×10⁵ p.s.i.

EXAMPLE 4

2.76 parts of sodium are dissolved in 31.6 parts of methanol followed by 14.8 parts of 4,4'-dicyanamidodiphenylmethane. 75.2 parts of dimethylacetamide are added and the methanol is removed under vacuum at 30–35° C. A white suspension is obtained. 10.6 parts of 4,4'-bis-(chloromethyl)-diphenylether are dissolved in 23.5 parts of dimethylacetamide and added dropwise with stirring over 30 minutes to the above mentioned suspension. The reaction mixture is stirred at room temperature for 18 hours.

The resulting pale yellow liquid is filtered to remove a small amount of insoluble material. The filtrate is poured into 500 parts of a 1% aqueous solution of acetic acid and the resulting white precipitate filtered and washed acid free with water. The filter cake is dried in a desiccator under vacuum, yielding 22.7 parts of a creamy white powder.

The product is free from chlorine and the infra-red spectrum is similar to that of product from Example 1.

By titration with sodium methoxide solution the product is found to contain 4.18% of —NHCN groups, and by elementary analysis the nitrogen content is 13.5%. The structure of the composition is thereby established as approximately:

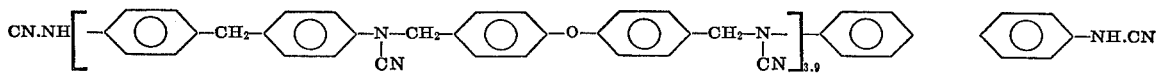

This composition melts in the range 120–130° C.

EXAMPLE 5

The dipotassium salt of 4,4'-dicyanamidodiphenylmethane is prepared as follows. 105 parts of 4,4'-dicyanamidodiphenylmethane, containing 93% of theoretical —NHCN groups, is stirred with 700 parts of ethanol until it dissolves, any small amount of insoluble matter present being filtered off. This solution is added to 1750 parts of an ethanol solution containing 49 parts of potassium hydroxide, and is stirred to complete the mixing. This solution is poured into 3500 parts of ether, and the resulting precipitate is filtered and washed with a mixture of ether and ethanol in the ratio 2:1. The filter cake is dried under vacuum at room temperature.

The IR spectrum of the product indicates the substantial absence of absorption at 3180 cm.$^{-1}$ due to —NH—; and the absorption due to —C≡N is shifted from its original position at 2220 cm.$^{-1}$ to 2080 cm.$^{-1}$, indicating substantial conversion of the free cyanamide group to the salt. The equivalent weight of the salt as determined by titration with 0.1 N hydrochloric acid, using a pH meter, is 170.8.

8.1 parts of the dipotassium salt of 4,4'-dicyanamidodiphenyl methane are suspended in 60 parts of dimethylacetamide and 4.23 parts of ethylene dibromide are added. The mixture is heated for 6 hours at 60° C., cooled, and filtered to remove a small amount of insoluble material. The filtrate is poured into 400 parts of a 1% aqueous solution of acetic acid, and the resulting white precipitate filtered, and washed acid-free with water. The filter-cake is dried in a desiccator, yielding 2.8 parts of a white powder. The infra-red spectrum of the product shows characteristic absorption bands at 2220 cm.$^{-1}$ (—C≡N) and 3180 cm.$^{-1}$ (—NH—). By titration with sodium methoxide solution, the product is found to contain 2.7% of —NHCN groups, and elementary analysis shows the composition to contain 20.7% of nitrogen. This establishes the structure as being approximately:

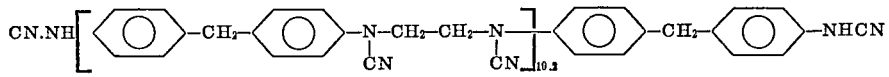

The product has a melting-range of 108–112° C. By compression moulding at 120° C. a hard, moderately flexible film may be obtained, which by thermogravimetric analysis is shown to have a decomposition temperature in air of about 350° C.

EXAMPLE 6

A solution containing 35 parts of 4,4′-bis-(chloromethyl)-diphenyl ether dissolved in 47.2 parts of dimethylacetamide is added over 30 minutes to a suspension of 63.3 parts of the dipotassium salt of 4,4′-dicyanamido diphenylmethane, prepared as in Example 5, in 141 parts of dimethylacetamide, and the reaction mixture is stirred at room temperature for 18 hours. The resulting turbid solution is filtered to remove potassium chloride and the clear filtrate poured into 1000 parts of a 1% aqueous solution of acetic acid. A white precipitate is formed which is filtered, washed acid free with water, and dried in a desiccator. 65 parts of a creamy white solid are obtained.

The product is free from chlorine and the infra-red spectrum shows characteristic peaks at 3180 cm.$^{-1}$ (—NH) 2220 cm.$^{-1}$ (—C≡N) and 1240 cm.$^{-1}$ (aromatic ether). By titration with sodium methoxide solution, the composition is found to contain 3.46% of —NHCN groups.

The product is moulded at 175° C. and 1000 p.s.i. into a sheet of thickness 0.015″, which is further cured by heating for 24 hours at 150° C. A clear flexible sheet of tensile strength 12.3×10$^3$ p.s.i. is obtained. Thermogravimetric analysis in air indicates that its decomposition point is within the range 420–430° C. On subjection of samples of this sheet to continuous heating at a temperature of 250° C., good flexibility is retained during a heating period of 2000 hours.

EXAMPLE 7

To a suspension of 2.43 parts of the dipotassium salt of 4,4′-dicyanamidodiphenylmethane, prepared as in Example 5, in 23.5 parts of dimethyl acetamide is added 0.87 parts of p-xylylene dichloride. The reaction mixture is stirred at room temperature for 2 hours, filtered to remove a small amount of insoluble material, and the clear greenish coloured filtrate is poured into 100 parts of a 2% aqueous solution of acetic acid. The resulting, whitish precipitate is filtered, washed acid free with water, and dried in a desiccator yielding 2.3 parts of a white powder. The product is free from chlorine and the infra-red spectrum shows bands at 3180 cm.$^{-1}$ (—NH) and 2220 cm.$^{-1}$ (—C≡N).

By the method of Example 1 a pale yellow, hard springy film may be obtained which by thermogravimetric analysis carried out in air is shown to have a decomposition temperature of about 370° C.

EXAMPLE 8

A composition is prepared by reacting a suspension of 2.43 parts of the dipotassium salt of 4,4′-dicyanamido- diphenylmethane, prepared as in Example 5, in 47 parts of dimethylacetamide with 1.37 parts of 9,19-bis(chloromethyl)-anthracene at room temperature for 4 hours, followed by heating in the range 140–150° C. for 1 hour.

After cooling to room temperature the resulting brownish solution is filtered to remove a small amount of insoluble material. The filtrate is poured into 100 parts of a 2% aqueous acetic acid solution and the resulting precipitate is filtered, washed acid free with water, and dried in a desiccator. The yield is 2.4 g. of a pale green powder.

The product is free from chlorine and the infra-red spectrum shows bands at 3180 cm.$^{-1}$ (—NH) and 2220 cm.$^{-1}$ (C≡N). Titration with sodium methoxide reagent shows the composition to contain 6.95% of —NHCN groups.

EXAMPLE 9

A composition is prepared by reacting a suspension of 2.43 parts of the dipotassium salt of 4,4′-dicyanamidodiphenylmethane, prepared as in Example 5, in 23.5 parts of dimethylacetamide, with 1.12 parts of 1,4-bis-(chloromethyl)-naphthalene at room temperature for 2 hours. The composition is isolated as in Example 7. The yield is 2.6 g. of greyish white powder.

The product is free from chlorine and the infra red spectrum shows bands at 3180 cm.$^{-1}$ (—NH) and 2220 cm.$^{-1}$ (—C≡N). Titration with sodium methoxide reagent shows the composition to contain 5.39% of —NHCN groups, and elementary analysis indicates the nitrogen content to be 14.8%. These results establish the structure as being approximately:

By the method of Example 1 a hard springy film may be obtained which by thermogravimetric analysis carried out in air is shown to have a decomposition temperature of about 365° C.

EXAMPLE 10

A composition is prepared by reacting a suspension of 2.43 parts of the dipotassium salt of 4,4′-dicyanamidodiphenylmethane, prepared in Example 5, in 23.5 parts of dimethylacetamide with 1.5 parts of bis-(chloromethyl)-durene at room temperature for 2 hours. The composition is isolated as in Example 7, giving a yield of 2.6 parts of a white powder.

The product is free from chlorine and the infra red spectrum shows bands at 3180 cm.$^{-1}$ (—NH) and 2220 cm.$^{-1}$ (—C≡N). By titration with sodium methoxide reagent the product is found to contain 4.95% of —NHCN groups, and elementary analysis indicates the nitrogen content to be 14.6%. These results establish the structure as being approximately:

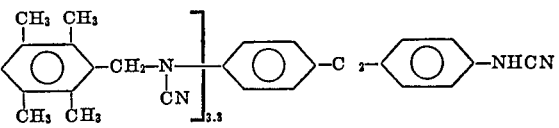

By the method of Example I a hard springy film may be obtained which by thermogravimetric analysis carried out in air is shown to have a decomposition temperature in the range 400–420° C.

EXAMPLE 11

To a suspension of 2.43 parts of the dipotassium salt of 4,4′ - dicyanamidodiphenylmethane, prepared as in Example 5, in 23.5 parts of dimethylacetamide is added 1.44 parts of 4,4′ - dichlorodiphenylsulphone. The reaction mixture is heated with stirring in the range 140–150° C. for 1 hour. The resulting dark green liquid is filtered to remove a small amount of insoluble material and the filtrate poured into 100 parts of a 2% aqueous acetic acid solution. The precipitate formed is filtered, washed acid free with water, and dried in a desiccator, yielding 2.2 parts of a greyish white powder.

The product is free from chlorine and the infra red spectrum shows bands at 3180 cm.$^{-1}$ (—NH—) and 2220 cm.$^{-1}$ (—C≡N). Bands at 1343 cm.$^{-1}$ and 1155 cm.$^{-1}$ indicate the presence of sulphone groups. Titration with sodium methoxide solution indicate the presence of 11.31% of —NHCN groups.

EXAMPLE 12

To a suspension of 2.16 parts of the dipotassium salt of 4,4′ - dicyanamidodiphenylmethane, prepared as in Example 5, in 23.5 parts of dimethylacetamide is added 1.27 parts of 1,10 - bis - (4 - chloromethyl - phenyl)-decane, and the reaction mixture is heated with stirring in the range 90–95° C. for 4 hours. The resulting dark green liquid is cooled to room temperature, filtered to remove a small amount of insoluble material, and the filtrate is poured into 50 parts of a 2% aqueous acetic acid solution. The precipitate formed is filtered, washed acid free with water, and dried in a desiccator, yielding 2.0 parts of a greyish white powder.

The product is free from chlorine and the infra red spectrum shows bands at 3180 cm.$^{-1}$ (—NH—) and 2220 cm.$^{-1}$ (—C≡N). Titration with sodium methoxide reagent shows the product to contain 5.95% of —NHCN groups, and elementary analysis shows the nitrogen content to be 12.1%. These results establish the approximate structure:

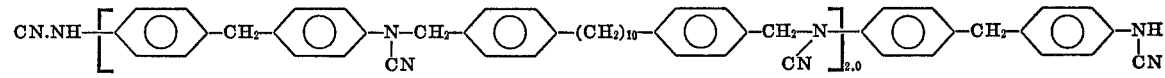

By the method of Example 1 a pale yellow flexible film may be obtained which my thermogravimetric analysis carried out in air is shown to have a decomposition temperature in the region of 300° C.

EXAMPLE 13

0.61 part of sodium is dissolved in 19.7 parts of methanol followed by 2.48 parts of m-Xylene dicyanamide. 23.5 parts of dimethylacetamide are added and the methanol removed under vacuum at 30–35° C. A solution containing 2.67 parts of 4,4′ - bis - (chloromethyl)-diphenylether dissolved in 4.7 parts of dimethylacetamide is added dropwise with stirring over 15 minutes keeping the temperature below 30° C., and the reaction mixture is allowed to stir at room temperature for 18 hours. The resulting turbid liquid is filtered, and the filtrate is poured into 150 parts of a 1.5% aqueous solution of acetic acid. After the addition of 40 parts of sodium chloride a pale yellow precipitate is formed. The precipitate is filtered, washed acid free and dried in a desiccator yielding 2.58 parts of a pale yellow powder.

The product, which melts in the range 85–90° C., is free from chlorine and the infra red spectrum shows characteristic bands at 3180 cm.$^{-1}$ (—NH—) 2220 cm.$^{-1}$ (—C≡N) and 1240 cm.$^{-1}$ (aromatic ether). Titration with sodium methoxide reagent shows the product to contain 3.17% of —NHCN groups.

By the method of Example 1 a clear pale yellow springy film may be obtained.

EXAMPLE 14

1.46 parts of 4,4′ - bis - (chloromethyl) - diphenylether are added to a suspension of 2.11 parts of the dipotassium salt of 4,4′ - dicyanamidodiphenylmethane, prepared as in Example 5, in 23.5 parts of dimethylacetamide and the reaction mixture is stirred at room temperature for 4 hours. The resulting liquid is filtered to remove a small amount of insoluble material, and the product is isolated from the filtrate by the method of Example 4, yielding 2.5 parts of a white powder. The product, which melts in the range 115–120° C., is free from chlorine and the infra red spectrum shows bands at 3180 cm.$^{-1}$ (—NH), 2220 cm.$^{-1}$ (—C≡N) and 1240 cm.$^{-1}$ (aromatic ether). Titration with sodium methoxide reagent shows the product to contain 1.73% —NHCN groups, indicating the approximate structure:

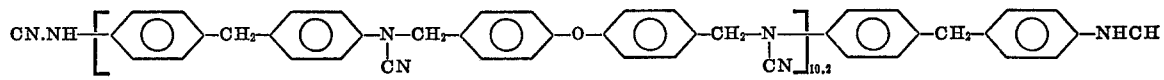

By the method of Example 1 a pale yellow, tough, highly flexible film may be obtained.

We claim:

1. Polymerizable compounds having the formula

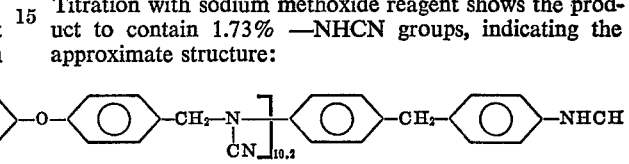

wherein R and R′ are divalent hydrocarbon groups or divalent hydrocarbon groups interrupted with oxygen or SO$_2$ and $n$ is at least 1.

2. Polymerizable compounds as in claim 1 wherein $n$ is an integer in the range 2–15.

3. Polymerizable compounds consisting of statistical mixture of compounds as claimed in claim 1.

4. Process for the manufacture of polymerizable compounds as claimed in claim 1 which comprises reacting a salt of an organic dicyanamide with an organic dihalogeno compound at a temperature ranging from room temperature to 160° C., the reactants being used in such proportions that the —NHCN groups present are in sufficient excess over the halogen atoms present to give a condensate containing two unreacted —NH.CN groups in the molecule.

5. A process as claimed in claim 4, wherein the organic dicyanamide is selected from 4,4′-dicyanamidodiphenylmethane
2,4-tolylene dicyanamide
m-phenylene dicyanamide and
m-xylene dicyanamide 6. A process as claimed in claim 4, wherein the organic dihalogeno compound is selected from 4,4′-bis(chloromethyl)diphenyl ether
ethylene dibromide
p-xylylene dichloride
9,10-bis(chloromethyl)anthracene
1,4-bis(chloromethyl)naphthalene
bis(chloromethyl)durene
4,4′-dichlorodiphenylsulphone
1,10-bis(4-chloromethylphenyl)decane 7. A process as claimed in claim 4, wherein the organic dicyanamide and the organic polyhalogeno compound are reacted together in the presence of a polar aprotic solvent.

8. A process as claimed in claim 4, wherein the reaction is accelerated by addition of a catalytic amount of metal iodide or metal fluoride.

9. Polymerizable compounds having the formula:

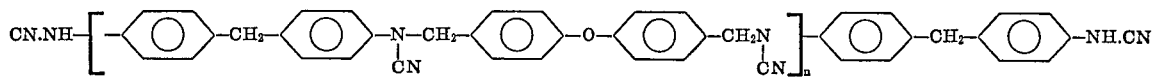

wherein $n$ is an integer having a value of from 2 to 15, or statistical mixtures of such compounds.

10. A polymerizable compounds having the formula:

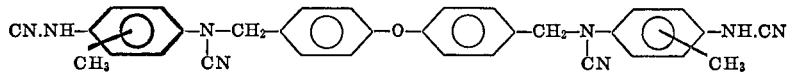

11. Polymerizable compounds having the formula:

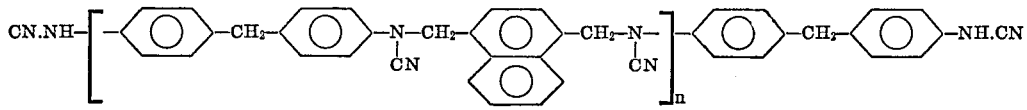

where $n$ is an integer having a value of from 2 to 15, or statistical mixtures of such compounds.

12. Polymerizable compounds having the formula:

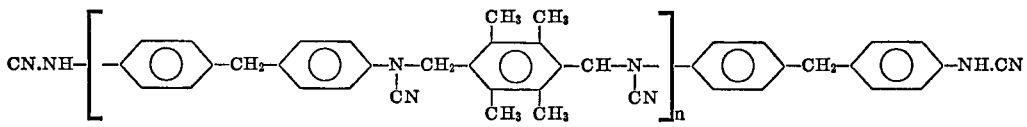

where $n$ is an integer having a value of from 2 to 15. or statistical mixtures of such compounds.

13. Polymerizable compounds having the formula:

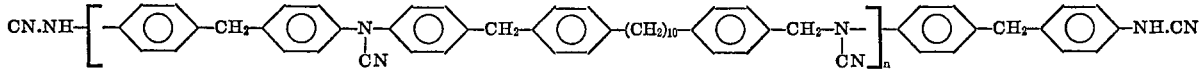

where $n$ is an integer haping a value of from 2 to 15, or statistical mixtures of such compounds.

References Cited

UNITED STATES PATENTS 3,308,101   3/1967   Ikeda _____ 260—78.4

FOREIGN PATENTS 1,009,892   11/1965   Great Britain.
1,164,523   9/1969    Great Britain.
1,523,551   3/1968    France.
1,190,184   4/1965    Germany.

MELVIN GOLDSTEIN, Primary Examiner

U.S. Cl. X.R.

260—2 R, 79.3 M, 551 C